United States Patent [19]
Amano et al.

[11] Patent Number: 4,589,251
[45] Date of Patent: May 20, 1986

[54] GRASS BAG ATTACHMENT FOR COMBINATION LAWN MOWER AND TRACTOR

[75] Inventors: Akira Amano, Tokyo; Kazuhiko Sasaki, Saitama, both of Japan

[73] Assignee: Honda Giken Kogyo Kabushiki Kaisha, Tokyo, Japan

[21] Appl. No.: 677,450

[22] Filed: Dec. 3, 1984

[30] Foreign Application Priority Data

Dec. 2, 1983 [JP] Japan .......................... 58-186757[U]

[51] Int. Cl.$^4$ ............................................. A01D 34/12
[52] U.S. Cl. ........................................ 56/202; 56/16.6
[58] Field of Search ................... 56/16.6, 202; 248/99, 248/101

[56] References Cited
U.S. PATENT DOCUMENTS 3,554,165  1/1971  Carter ..................................... 119/61
3,934,392  1/1976  Moery et al. ........................... 56/202
4,106,272  8/1978  Peterson et al. ....................... 56/202
4,156,337  5/1979  Knudson ................................ 56/16.6
4,393,645  7/1983  Moore .................................... 56/16.6

Primary Examiner—Robert P. Swiatek
Assistant Examiner—David L. Tarnoff
Attorney, Agent, or Firm—Armstrong, Nikaido, Marmelstein & Kubovcik

[57] ABSTRACT

A grass bag attachment for a lawn mower mounted on and disposed below a tractor having a chassis. The grass bag attachment includes a pair of spaced brackets adapted to be mounted on a rear end of the chassis, a support post composed of a pair of spaced, substantially vertical portions and a cross portion joining the vertical portions at upper ends thereof, the vertical portions having respective lower ends detachably connected to the brackets, respectively, by pins, and a plurality of grass bags having front central portions supported on the support post.

4 Claims, 6 Drawing Figures

GRASS BAG ATTACHMENT FOR COMBINATION LAWN MOWER AND TRACTOR

BACKGROUND OF THE INVENTION

1. Field of the Invention

The present invention relates to an improved grass bag attachment for use on a combination lawn mower and tractor or a riding lawn mower.

2. Description of the Prior Art

There are known lawn and garden tractors having an engine mounted on a front portion of a tractor body, an operator's station or seat mounted on a rear portion of the tractor body, and a mower deck disposed below the tractor body. For example, U.S. Pat. No. 4,393,645 discloses such a mower and garden tractor having a bagger attachment in which a bracket or frame is mounted on a rear end of the tractor, and grass bag structures are supported on an upper portion of the bracket. The grass bag structures are covered with an openable top. Grass clippings cut off by mower blades housed in the mower deck are discharged through a discharge duct into the top from which the grass clippings are deposited in the grass bag structures.

In the disclosed bagger attachment, the two grass bag structures are supported by only one bracket or frame. Although the bag attachment is simple in construction, it requires an increased degree of rigidity high enough to support the two grass bagger structures.

SUMMARY OF THE INVENTION

It is an object of the present invention to provide a grass bag attachment for a lawn and garden tractor having two grass bags on a rear end of the tractor body, the grass bag attachment having a grass bag support post which can support the grass bags reliably, can easily be mounted on and detached from the tractor body, and prevents the grass bags from being tilted laterally due to the increased weight of grass clippings collected in the grass bags.

According to the present invention, there is provided a grass bag attachment for a lawn mower mounted on and disposed below a tractor having a chassis, the grass bag attachment comprising a pair of spaced brackets adapted to be mounted on a rear end of the chassis, a support post composed of a pair of spaced, substantially vertical portions and a cross portion joining the vertical portions at upper ends thereof, the vertical portions having respective lower ends detachably connected to said brackets, respectively, by pins, and a plurality of grass bags having front central portions supported on the support post.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 6:
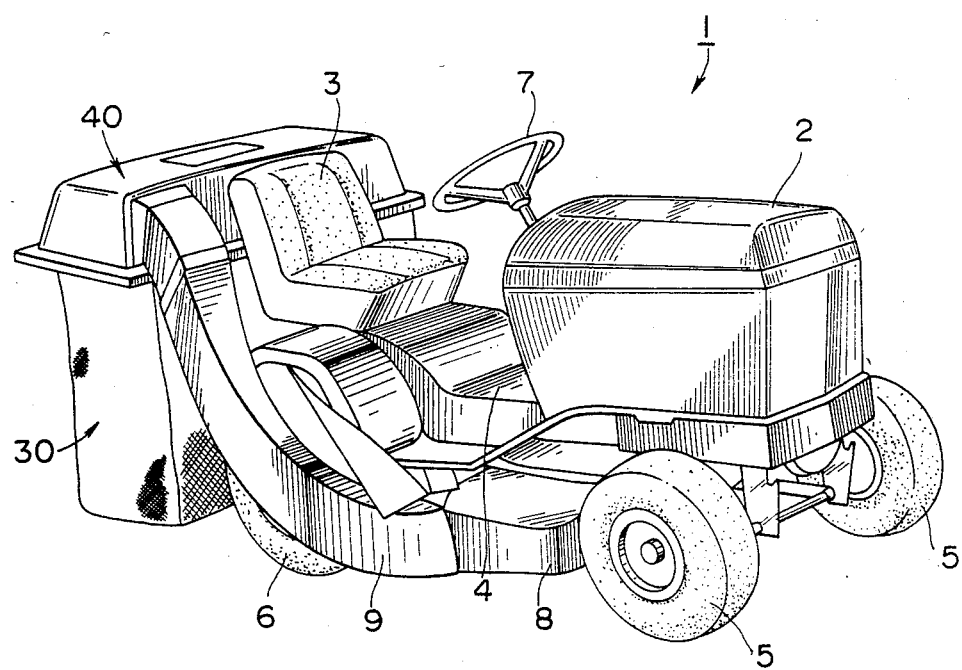
FIG. 6 is a perspective view of the combination lawn mower and tractor.

FIG. 6 illustrates a combinator lawn mower and tractor or a riding lawn mower 1. An engine (not shown) is mounted on a front portion of a tractor body and covered with an engine hood 2. An operator's station or seat 3 is mounted on a rear portion of the tractor body, with a floor 4 extending fowardly from the seat 3. A pair of steerable front wheels 5, 5 is rotatably mounted on the front portion of the tractor body, and a pair of drive rear wheels 6, 6 is mounted on a rear portion of the tractor body. A steering wheel 7 is rotatably mounted on the tractor body and operatively coupled to the front wheels 5, 5 for steering them.

A mower deck or unit 8 is mounted on the tractor body and disposed below the floor 4. The mower deck 8 houses a number of mower blades mounted on a vertical shaft for rotation in a horizontal plane. The vertical shaft is rotated by a belt and pulley mechanism operatively connected to a mower output shaft of the engine. A grass discharge duct 9 is joined to a side of the mower deck 8 and extends alongside of the tractor body to a position rearward of the tractor body.

Figure 1:
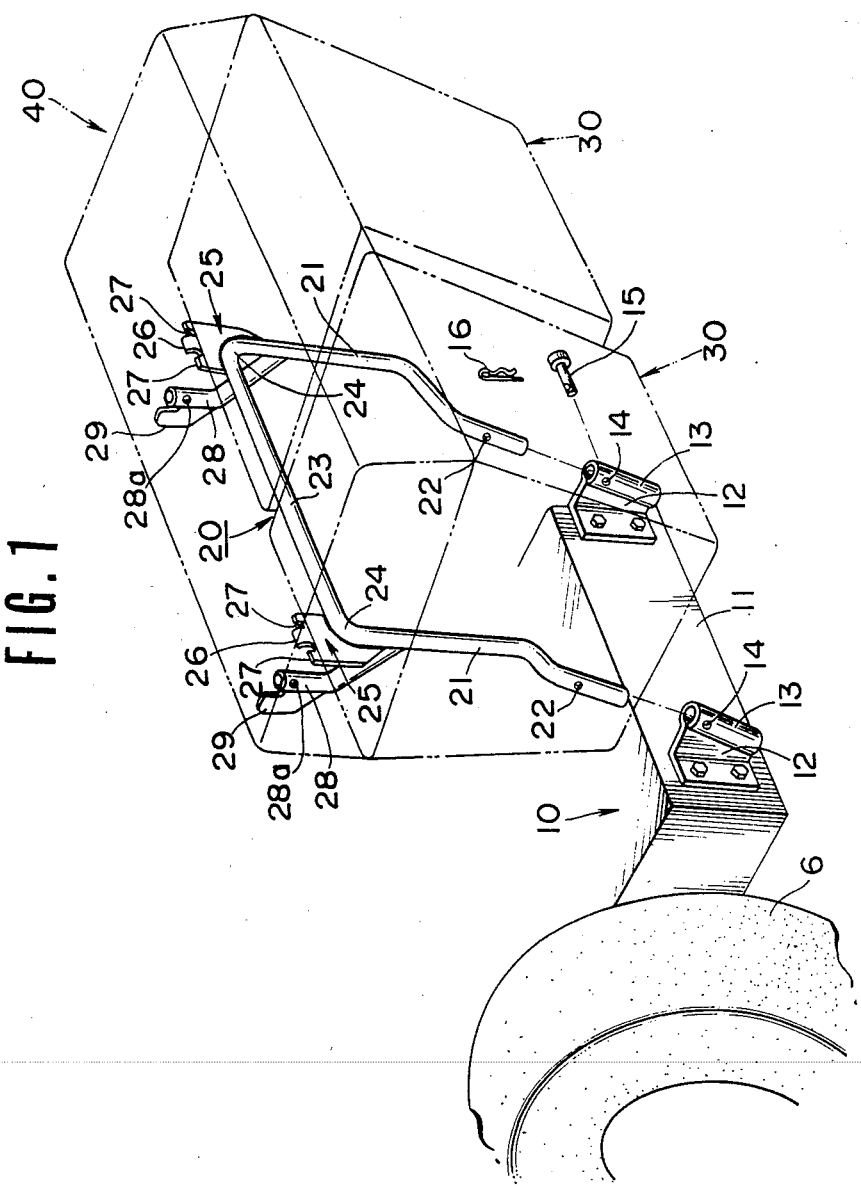
FIG. 1 is a fragmentary exploded perspective view of a grass bag attachment for use on a combination lawn mower and tractor, according to the present invention.

The combination lawn mower and tractor 1 includes a chassis 10 (FIGS. 1, 4 and 5) having a rear end 11 to which a pair of laterally spaced brackets 12, 12 is bolted. As shown in FIG. 1, each of the brackets 12 has a pipe 13 inclined slightly rearwardly and upwardly and having a pin hole 14 defined transversely therethrough.

In FIG. 1, a support post 20 comprises a bent pipe substantially in the shape of an inverted U, as seen in front elevation. The support post 20 includes a pair of laterally spaced vertical portions 21, 21 having lower portions inclined slightly rearwardly and upwardly and having pin holes 22, 22 defined transversely through lower end portions thereof. The vertical portions 21, 21 are joined together at upper ends by a cross portion 23 including a pair of spaced shoulders 24, 24 with a pair of support brackets 25, 25 in the form of flat plates welded respectively to front surfaces of the shoulders 24, 24. Each of the support brackets 25, 25 projects upwardly beyond one of the shoulders 24, 24 and has on an upper edge a central tongue 26 and a pair of spaced steps 27, 27 positioned one on each side of the central tongue 26.

As better shown in FIGS. 1 and 4, a pair of auxiliary pipes 28, 28 is welded to upper front surfaces, respectively, of the vertical portions 21, 21 below the support brackets 25, 25, the auxiliary pipes 28, 28 extending upwardly and forwardly. The auxiliary pipes 28, 28 have respective pin holes 28a, 28a defined laterally through upper end portions thereof. A pair of stops 29, 29 is welded to upper front surfaces, respectively, of the auxiliary pipes 28, 28 and projects fowardly.

The support post 20 is detachably mounted on the rear end 11 of the chassis 10 by inserting the lower end portions of the vertical portions 21, 21 respectively into the pipes 13, 13 of the brackets 12, 12, inserting pins 15, 15 laterally through the aligned pairs of pin holes 14, 22, and retaining the pins 15, 15 in position against removal with split cotter pins 16, 16, respectively.

Figure 2:
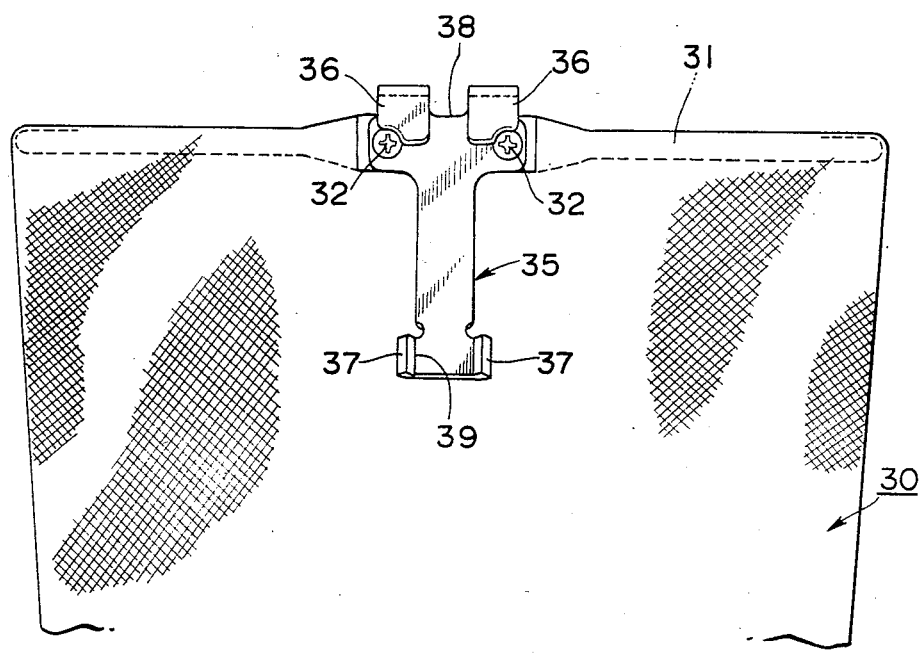
FIG. 2 is a fragmentary front elevational view of a grass bag.
Figure 3:
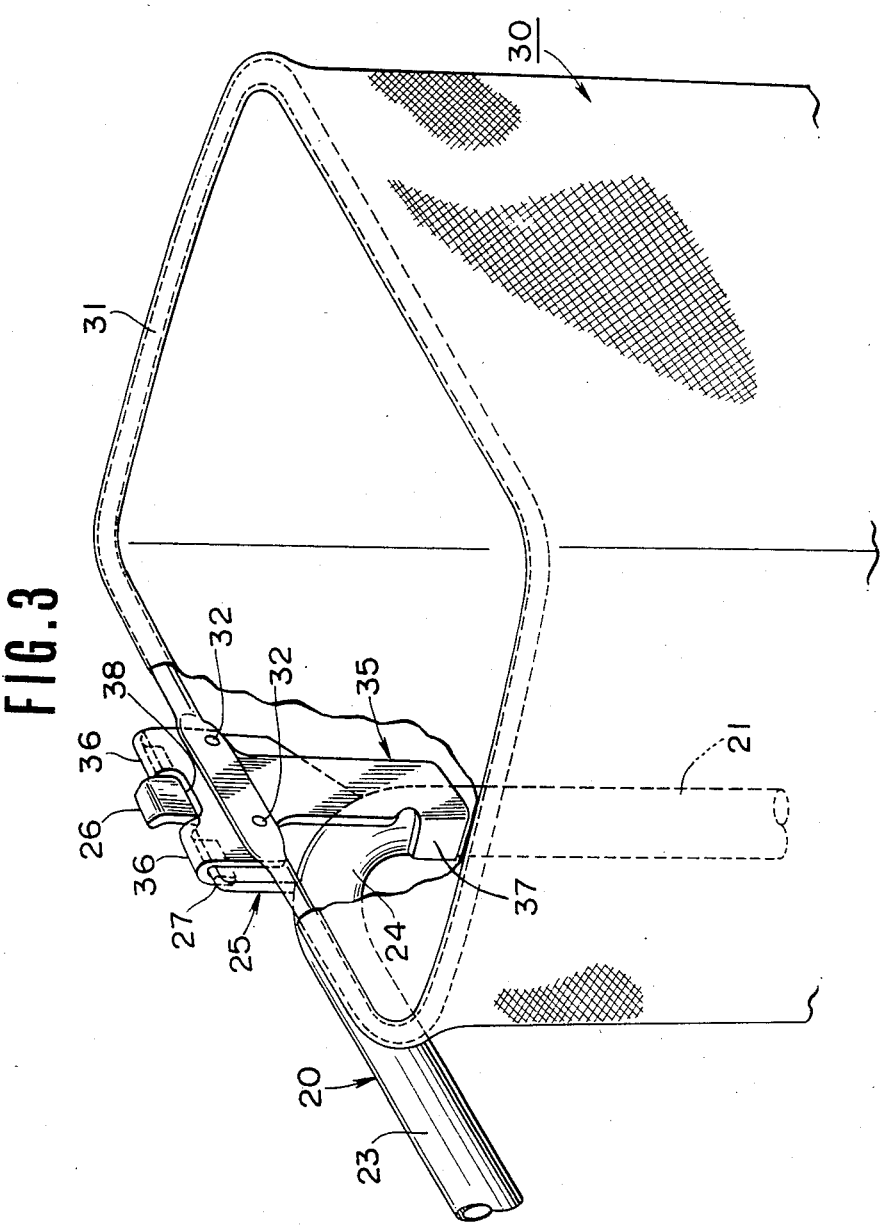
FIG. 3 is a fragmentary perspective view of the grass bag as attached to a support post.

As illustrated in FIGS. 2 and 3, a fabric grass bag 30 has a hook member 35 fixedly mounted centrally on an upper front edge thereof. More specifically, the grass bag 30 has an upper open frame 31 substantially in the form of a square as seen in plan, and the hook member 35 in the form of a substantially flat plate is fastened to the frame 31 by means of a pair of screws 32, 32. The hook member 35 has a pair of laterally spaced hooks 36, 36 on an upper edge thereof with a recess defined therebetween, the hooks 36, 36 being directed forwardly. The hook member 35 includes a pair of laterally spaced fingers 37, 37 projecting from a lower portion thereof and defining a recess therebetween for fitting engagement with an upper portion of each of the vertical pipe portions 21, 21. Two grass bags 30 of the above construction are supported on the support post 20.

For mounting each grass bag 30 on the support post 20, the hooks 36, 36 are placed downwardly on the steps 24, 24, respectively, of the support bracket 25, with the central tongue 26 positioned between the hooks 36, 36, and then the fingers 37, 37 are brought forwardly into fitting engagement with the upper portion of the vertical pipe portion 21, as shown in FIG. 3. The grass bag 30 is prevented from being laterally displaced out of position by the central tongue 26 and the fingers 37, 37.

Figure 4:
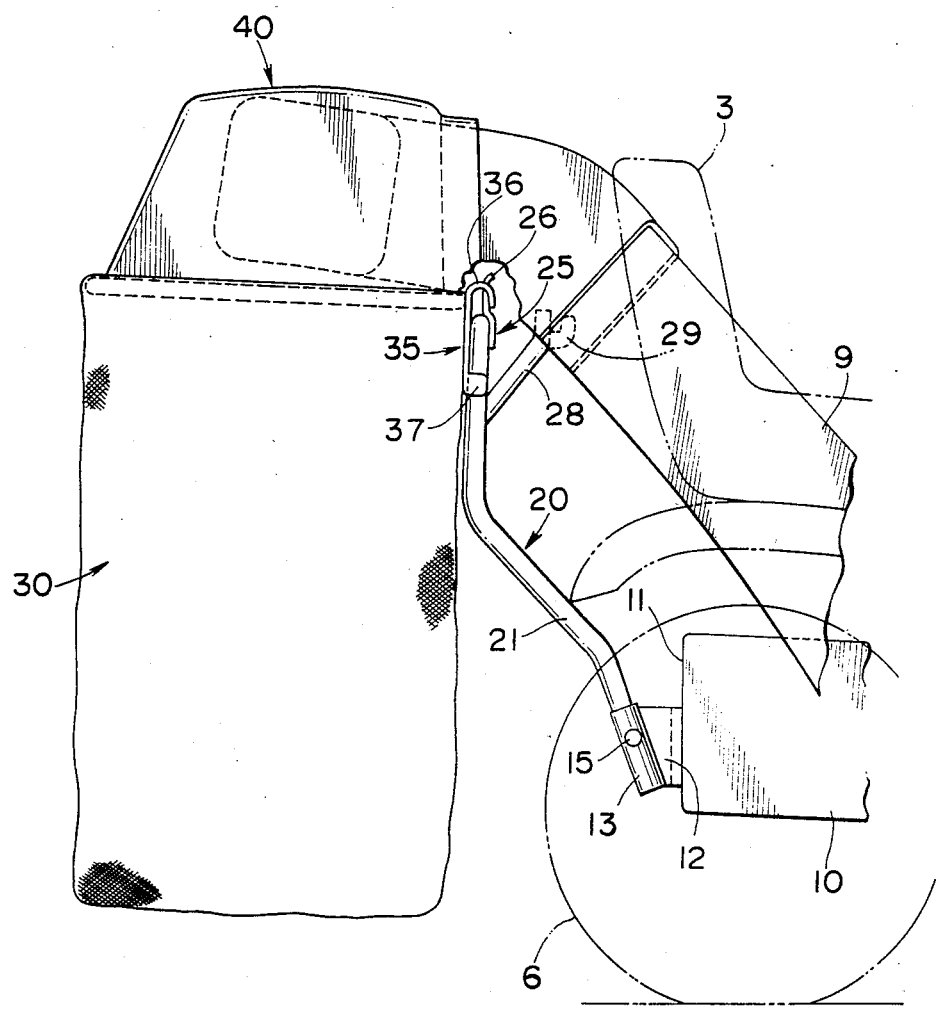
FIGS. 4 and 5 are fragmentary side elevational and plan views of a rear portion of the combination lawn mower and tractor with the grass bags attached.
Figure 5:
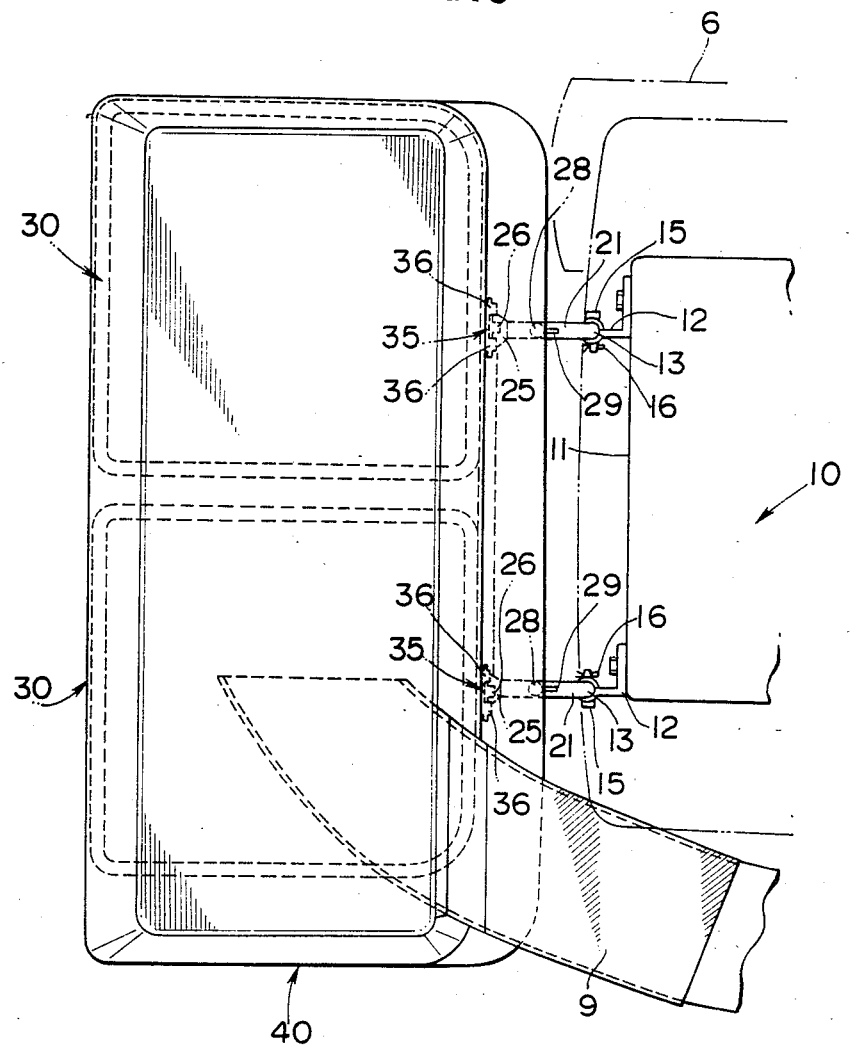

As shown in FIGS. 4 and 5, a top cover 40 in the form of a downwardly open box is then hinged at its front edge to the auxiliary pipes 28, 28 of the support post 20. More specifically, the top cover 40 has a pair of brackets (not shown) on its front side wall, and pins are inserted through the brackets and the pin holes 28a, 28a in the auxiliary pipes 28, 28. Thus, the top cover 40 is openably mounted on the grass bags 30, 30 supported on the support post 20. The top cover 40 is prevented by the stops 29, 29 from opening beyond a predetermined angular interval. The grass discharge duct 9 is connected to the front side wall of the top cover 40 near one side thereof and has its rear end projecting into the top cover 40 for discharging grass clippings into the grass bags 30, 30.

The grass bag attachement of the invention is advantageous for the following reasons: The support post 20 of the inverted U shape is firmly attached to the chassis 10 through the two laterally spaced vertical pipe portions 21, 21. The support post 20 with the two grass bags 30, 30 mounted is securely held in position against wobbling or displacement, and hence the grass bags 30, 30 are supported stably in position. Since the support post 20 is mounted on the brackets 12, 12 by the pins 15, 15, it can readily be attached or detached simply by inserting or removing the pins 15, 15.

The front central portions of the grass bags 30, 30 are supported at the laterally spaced shoulders 24, 24 at the upper portion of the support post 20. This arrangement allows the grass bags 30, 30 to be kept in balance transversely, rather than being laterally tilted, even when a large quantity of grass clippings are collected in the grass bags 30, 30. The support post 20 thus firmly attached to the chassis 10 is also prevented from being tilted rearwardly or laterally due to the weight of grass clippings in the grass bags 30, 30.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

What is claimed is:

1. A grass bag attachment for accepting a pair of grass bags for a lawn mower mounted on and disposed below a tractor having a chassis, said grass bag attachment comprising:
    (a) a pair of spaced brackets adapted to be mounted on a rear end of the chassis;
    (b) a support post composed of a pair of spaced, substantially vertical portions and a cross portion joining said vertical portions at upper ends thereof, said vertical portions having respective lower ends detachably connected to said brackets, respectively, by pins; and
    (c) a pair of grass bags having front central portions supported on said support post, wherein said grass bags include hook members mounted on said front central portions thereof in order to keep each grass bag in balance transversely, said support post having support brackets mounted respectively on front surfaces thereof and spaced from each other along said cross portion at the upper ends of the vertical portions, respectively, of the support post, said grass bags being supported on said support post with said hook members held in hooking engagement with said support brackets, and wherein each of said support brackets is in the form of a substantially flat plate, said support brackets being attached to said support post and lying in a plane parallel to said cross portion, each of said support brackets having a portion projecting upwardly beyond said support post and including a central tongue and a pair of steps disposed one on each side of said central tongue and lower than the central tongue.

2. A grass bag attachment according to claim 1, wherein each of said hook members is in the form of a substantially flat plate and has on an upper edge thereof a pair of hooks engageable with said steps, respectively, and a recess defined between said hooks and receptive of said central tongue therein.

3. A grass bag attachment according to claim 1, wherein each of said hook members has on a lower end thereof a pair of spaced fingers defining a recess therebetween receptive of one of said vertical portions of said support post.

4. A grass bag attachment according to claim 1, wherein each of said brackets includes an inclined pipe having a pin hole, said pins being inserted through said pin holes and said lower ends of the vertical portions.

* * * * *